(12) United States Patent
Gibson

(10) Patent No.: US 11,415,249 B2
(45) Date of Patent: Aug. 16, 2022

(54) HIGH STRENGTH FLEXIBLE FERRULE

(71) Applicant: Parker-Hannifin Corporation, Cleveland, OH (US)

(72) Inventor: James D. Gibson, Huntsville, AL (US)

(73) Assignee: Parker-Hannifin Corporation, Cleveland, OH (US)

( * ) Notice: Subject to any disclaimer, the term of this patent is extended or adjusted under 35 U.S.C. 154(b) by 193 days.

(21) Appl. No.: 16/257,012

(22) Filed: Jan. 24, 2019

(65) Prior Publication Data

US 2019/0242505 A1 Aug. 8, 2019

Related U.S. Application Data

(62) Division of application No. 14/899,272, filed as application No. PCT/US2014/043230 on Jun. 19, 2014, now abandoned.

(60) Provisional application No. 61/836,719, filed on Jun. 19, 2013.

(51) Int. Cl.
  *F16L 19/10* (2006.01)
(52) U.S. Cl.
  CPC ............ *F16L 19/10* (2013.01); *F16L 19/103* (2013.01); *F16L 19/106* (2013.01)
(58) Field of Classification Search
  CPC ....... F16L 19/10; F16L 19/106; F16L 19/103; F16L 19/08
  See application file for complete search history.

(56) References Cited

U.S. PATENT DOCUMENTS

| 2,182,811 | A | * | 12/1939 | Kocher | .................. | F16L 19/10 |
|           |   |   |         |        |                    | 285/3      |
| 2,211,856 | A | * | 8/1940  | Kreidel | ................. | F16L 19/10 |
|           |   |   |         |         |                   | 285/341    |
| 2,536,745 | A |   | 1/1951  | Herold  |                   |            |
| 2,695,796 | A |   | 11/1954 | Woodling |                  |            |
| 2,761,704 | A |   | 9/1956  | Crawford |                  |            |

(Continued)

FOREIGN PATENT DOCUMENTS

| DE | 834626 C   | 3/1952 |
| DE | 3333866 A1 | 4/1985 |

(Continued)

OTHER PUBLICATIONS

U.S. Appl. No. 14/899,272, filed Dec. 17, 2018.

(Continued)

*Primary Examiner* — Zachary T Dragicevich
*Assistant Examiner* — James A Linford
(74) *Attorney, Agent, or Firm* — Renner, Otto, Boisselle & Sklar, LLP

(57) ABSTRACT

A ferrule for coupling a tube to a fitting body of a fitting assembly. The ferrule may include a reduced thickness portion near a nut end of the ferrule, the reduced thickness portion being thinner than adjacent portions of the ferrule and configured to flex when the fitting assembly is made up. The ferrule may include a thin section toward the bite end of the ferrule, and an axially middle portion, between the thin section and the reduced thickness portion, may be configured to bow radially outwardly during assembly. The reduced thickness portion may have a radial thickness less than any other portion of the ferrule between the nut end and a bite edge of the ferrule closest to the nut end.

17 Claims, 12 Drawing Sheets

(56) References Cited

U.S. PATENT DOCUMENTS

| | | | |
|---|---|---|---|
| 3,120,969 | A | 2/1964 | Schmohl |
| 3,290,069 | A | 12/1966 | Davis |
| 4,799,717 | A | 1/1989 | Kingsford |
| 5,074,599 | A | 12/1991 | Wirbel et al. |
| 7,695,027 | B2 | 4/2010 | Williams et al. |
| 8,480,135 | B2 | 7/2013 | Williams et al. |
| 2005/0035593 | A1* | 2/2005 | Auray .................. H02G 3/0675 285/154.1 |
| 2007/0164563 | A1* | 7/2007 | Arstein .................. F16L 15/00 285/249 |

FOREIGN PATENT DOCUMENTS

| | | |
|---|---|---|
| DE | 3737062 A1 | 5/1988 |
| DE | 9212228 U1 | 11/1992 |
| DE | 4212397 A1 | 10/1993 |
| EP | 0307531 A1 | 3/1989 |
| FR | 2306391 A1 | 10/1976 |
| FR | 2560344 A1 | 8/1985 |
| GB | 534291 A | 3/1941 |
| GB | 840164 A | 7/1960 |
| WO | 2007/002576 A2 | 1/2007 |
| WO | 2008/057983 A1 | 5/2008 |

OTHER PUBLICATIONS

International Search Report and Written Opinion for corresponding patent application No. PCT/US2014/043230 dated Mar. 26, 2015.
Written Opinion of the International Preliminary Examining Authority for corresponding patent application No. PCT/US2014/043230 dated Sep. 18, 2015.
International Preliminary Report on Patentability for corresponding patent application No. PCT/US2014/043230 dated Oct. 30, 2015.

* cited by examiner

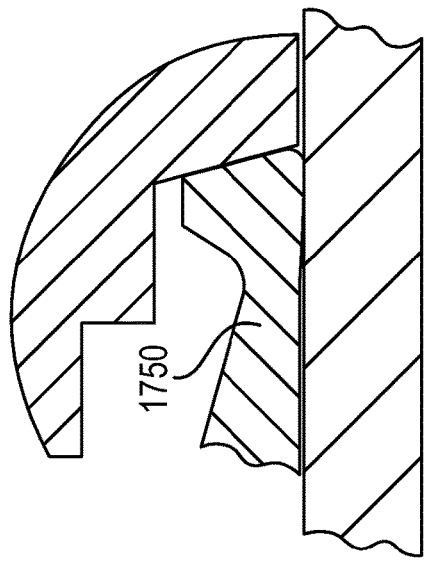
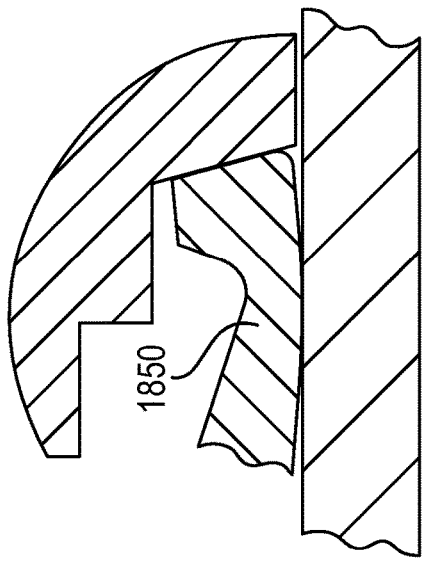
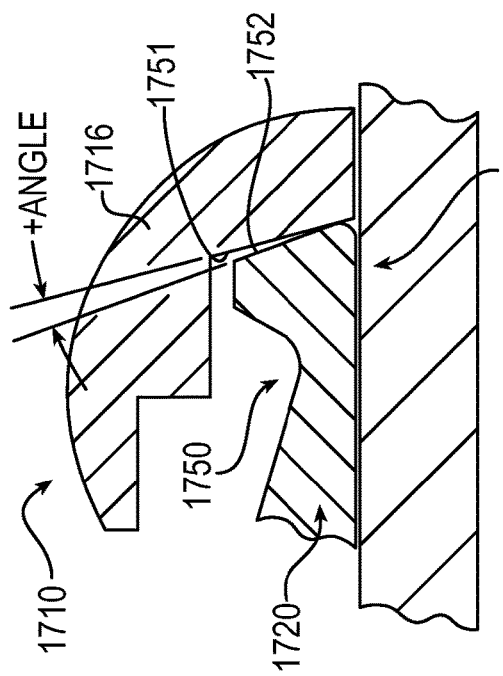
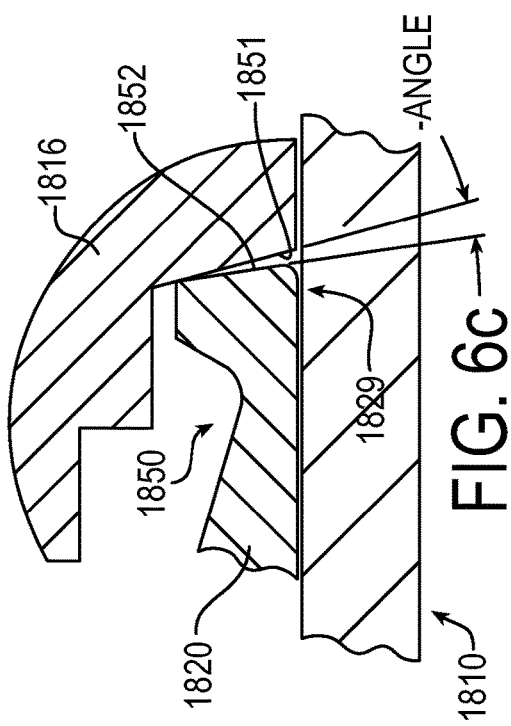

HIGH STRENGTH FLEXIBLE FERRULE

RELATED APPLICATIONS

This application is a divisional of U.S. Non-Provisional application Ser. No. 14/899,272 submitted on Dec. 17, 2015, which is a national phase of International Application No. PCT/US2014/043230 filed Jun. 19, 2014 and published in the English language, which claims priority of U.S. Provisional Application No. 61/836,719 filed on Jun. 19, 2013, which are hereby incorporated herein by reference.

FIELD OF INVENTION

The present invention relates generally to tube fittings, and more particularly to high strength flexible ferrule tube fittings.

BACKGROUND

As tubing materials become stronger and harder for higher pressure applications, the ferrule materials have also become much stronger in order to grip, bite and hold the stronger tubing material. As a result, the forces and torques required to assemble these fittings are increasingly making proper assembly more difficult.

SUMMARY OF INVENTION

Therefore, exemplary ferrules and ferrule assemblies include features providing advantages compared to conventional ones. For example, an exemplary ferrule may be manufactured from stronger materials needed to grip, bite and otherwise hold these stronger tubing materials. A ferrule bite edge may be more uniform and less prone to damage providing a more consistent grip and bite of the tubing. A ferrule leading edge may more easily slide and bow during assembly to reduce load/torque required to assemble the fitting. A ferrule may bow/flex easier at the rear, providing more ferrule spring preload for systems with vibration, impulses, thermo-cycles, etc. A ferrule may more easily hinge at the rear to grip the tube and better dampen vibration.

According to one aspect of the invention, a ferrule for coupling a tube to a fitting body includes an outer cam surface for bearing against a fitting body or another ferrule; an inner surface defining a central bore extending through a length of a body of the ferrule along a longitudinal direction from a bite edge to a nut end; a recess surface defining a counter bore extending from a bite end to the bite edge, the bite edge thereby recessed from the bite end a distance, X, along the longitudinal direction toward the nut end; wherein a radial distance, A, from the recess surface to the outer cam surface at an axial location of the bite edge (a distance, X from the bite end) is 50% or greater than a radial distance, H, from the inner surface to the recess surface.

Optionally, the outer cam surface includes a convex portion and/or one or more flat portions from the bite end to at least about halfway towards the nut end.

Optionally, the outer cam surface includes a convex portion along most of the length of the body.

Optionally, the outer cam surface includes a plurality of flat portions having respective angles with respect to a longitudinal axis, the respective angles collectively approximating a convex surface.

Optionally, the inner surface includes a concave portion.

Optionally, X is between 0.5 and 2 times H.

Optionally, X is between 1 and √3 times H.

Optionally, an angle between the bite edge and the inner surface is between 75 and 115 degrees.

Optionally, the angle between the bite edge and the inner surface is approximately 90 degrees.

According to another aspect of the invention, a fitting assembly for coupling a first tube to a fitting body includes a front ferrule for engagement with the fitting body; and a back ferrule for engagement with a nut, wherein, one of the front ferrule or the back ferrule is a ferrule having any of the features described above.

Optionally, the front ferrule is a ferrule having any of the features described above.

Optionally, the back ferrule is a ferrule having any of the features described above.

Optionally, the back ferrule and the front ferrule are ferrules having any of the features described above.

Optionally, the back ferrule includes an outer cam surface having a convex portion and/or one or more flat portions from the bite end to at least about halfway towards the nut end.

Optionally, the back ferrule includes an outer cam surface having a convex portion along most of the length of the body.

Optionally, the back ferrule includes an outer cam surface having a plurality of flat portions having respective angles with respect to a longitudinal axis, the respective angles collectively approximating a convex surface.

Optionally, the back ferrule includes an inner surface having a concave portion.

According to another aspect of the invention, a ferrule for coupling a tube to a fitting body includes a body portion having an outer cam surface for bearing against a fitting body or another ferrule and having an inner surface defining a central bore extending through a length of the body portion along a longitudinal direction; and a nose portion having an outer cam surface for bearing against a fitting body or another ferrule and having a recess surface defining a bore extending through a length of the nose portion along the longitudinal direction; wherein an inner diameter of the nose portion is greater than an inner diameter of the body portion, and wherein the outer cam surfaces have respective slopes forming a continuous outer surface, the continuous outer surface being free of an inflection point from at least an outermost axial extent of the nose portion to a position along the body portion from the nose portion equal to an axial length of the nose portion.

Optionally, a radial distance, A, from the recess surface to the outer cam surface at an axial location of a bite edge is 50% or greater than a radial distance, H, from the inner surface to the recess surface.

Optionally, the outer cam surface includes a convex portion and/or one or more flat portions from the bite end to at least about halfway towards the nut end.

Optionally, the outer cam surface includes a convex portion along most of a length of the ferrule.

Optionally, the outer cam surface includes a plurality of flat portions having respective angles with respect to a longitudinal axis, the respective angles collectively approximating a convex surface.

Optionally, the inner surface includes a concave portion.

Optionally, X is between 0.5 and 2 times H.

Optionally, X is between 1 and √3 times H.

Optionally, an angle between the bite edge and the inner surface is between 75 and 115 degrees.

Optionally, the angle between the bite edge and the inner surface is approximately 90 degrees.

According to another aspect of the invention, a fitting assembly for coupling a first tube to a fitting body includes a front ferrule for engagement with the fitting body; and a back ferrule for engagement with a nut, wherein, one of the front ferrule or the back ferrule is a ferrule having any of the features described above.

Optionally, the front ferrule is a ferrule having any of the features described above.

Optionally, the back ferrule is a ferrule having any of the features described above.

Optionally, the front and the back ferrule are ferrules having any of the features described above.

Optionally, the back ferrule includes an outer cam surface having a convex portion and/or one or more flat portions from the bite end to at least about halfway towards the nut end.

Optionally, the back ferrule includes an outer cam surface having a convex portion along most of the length of the body.

Optionally, the back ferrule includes an outer cam surface having a plurality of flat portions having respective angles with respect to a longitudinal axis, the respective angles collectively approximating a convex surface.

Optionally, the back ferrule includes an inner surface having a concave portion.

According to another aspect of the present invention, a fitting assembly for coupling a first tube to a fitting body, includes a ferrule including a reduced thickness portion near a nut end of the ferrule, the reduced thickness portion being thinner than adjacent portions of the ferrule and configured to flex when the fitting assembly is made up; and a nut having a bearing surface for bearing against a bearing surface of the ferrule.

Optionally, the ferrule is a ferrule having any of the features described above.

Optionally, an angle of the bearing surface of the ferrule is between 3 and 10 degrees different than an angle of the bearing surface of the nut, the angle mismatch thereby causing the reduced thickness portion to flex in a predetermined direction during make up.

Optionally, the bearing surface of the ferrule is about 5 degrees more or 5 degrees less than the bearing surface of the nut, the angle mismatch thereby causing the reduced thickness portion to flex in a predetermined direction during make up.

Optionally, the bearing surface of the ferrule is about 5 degrees more than the bearing surface of the nut.

Optionally, the bearing surface of the ferrule is about 5 degrees more or 5 degrees less than the bearing surface of the nut.

Optionally, the ferrule is surface hardened.

Optionally, an outer surface of the ferrule is at least 60 Brinell scale points harder than a core of the ferrule.

Optionally, the ferrule further includes an undercut between the inner surface and the nose portion.

Optionally, the ferrule further includes a radially offset inner surface with a circumference larger than a corresponding inner surface of the ferrule.

Optionally, the ferrule further includes a radially offset inner surface longitudinally extending more than 50% of a longitudinal length of the ferrule.

The foregoing and other features of the invention are hereinafter described in greater detail with reference to the accompanying drawings.

BRIEF DESCRIPTION OF THE DRAWINGS

FIG. 6a shows a partial cross-sectional view of an exemplary tube fitting assembly having mismatched bearing surfaces before makeup.

FIG. 6b shows a partial cross-sectional view of the tube fitting assembly of FIG. 6a after makeup.

FIG. 6c shows a partial cross-sectional view of an exemplary tube fitting assembly having mismatched bearing surfaces before makeup.

FIG. 6d shows a partial cross-sectional view of the tube fitting assembly of FIG. 6c after makeup.

DETAILED DESCRIPTION

Figure 1:
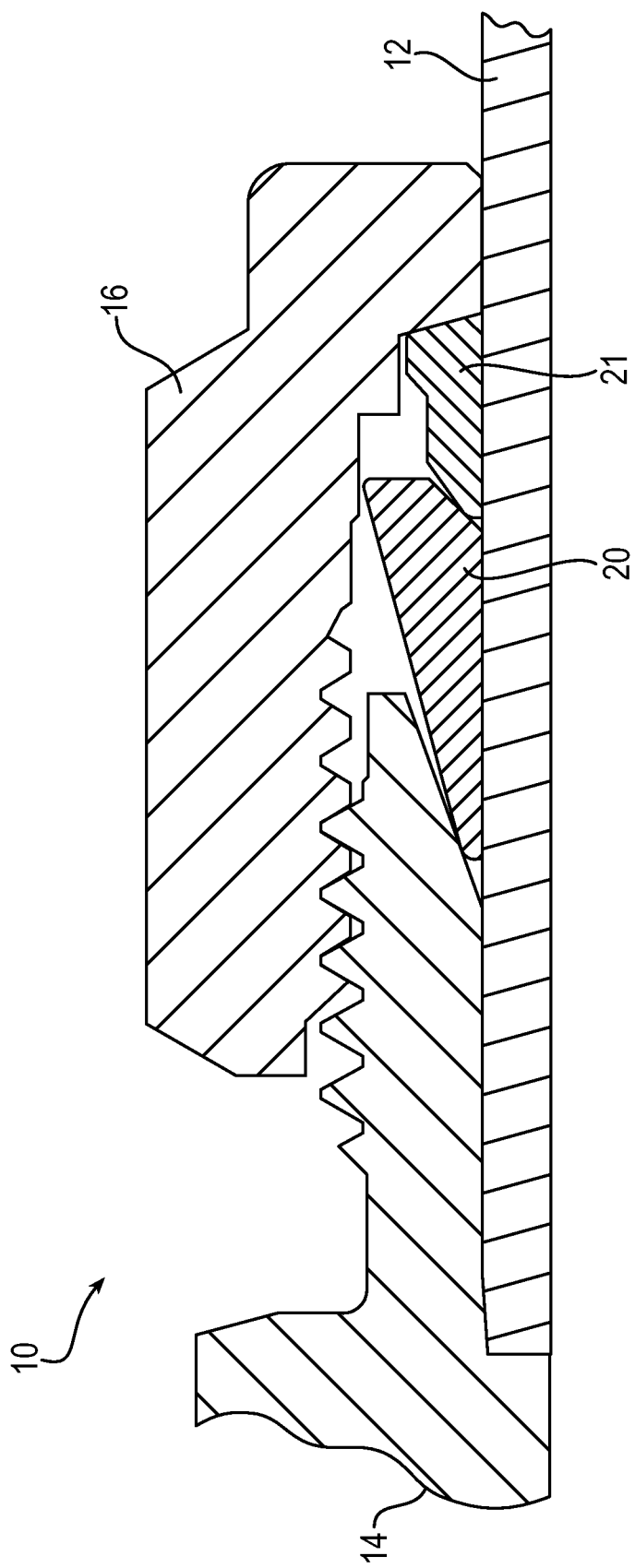
FIG. 1 shows a top-half cross-sectional view of a conventional two-ferrule tube fitting assembly.

Referring to FIG. 1, a conventional tube fitting assembly 10 is illustrated. The assembly includes a tube 12 coupled to a fitting body 14 by a nut 16, a front ferrule 20, and a back ferrule 21. The fitting body 14 and the nut 16 are threadably engageable with each other, and force the front and back ferrules into mechanical engagement with the tube 12. In particular, as the nut is tightened on the body, the nut mechanically engages an adjacent end of the back ferrule, pushing the back ferrule against the front ferrule, which is pushed into the body, and down into the tube.

Throughout this application, both one and two ferrule assemblies are described. It is contemplated that, unless otherwise stated, aspects of the present invention may be applicable to either one or two ferrule assemblies. In two ferrule assemblies, either of the front or back ferrule or both the front and back ferrule may include one or more features described herein. Further, exemplary ferrules may be surface- or through-hardened by various methods (including, for example, multiple layers of hardness with the respective layers being hardened by the same or by different techniques) and to varying depths or may be non-surface-hardened ferrules. In some exemplary fitting assemblies for example, exemplary single ferrules and back ferrules are case hardened to ensure uniform bite/grip of the tube. For example a bite depth may be in the range of 0.001-0.003 inches.

In an embodiment the outer surface of the ferrule may be hardened to more than 60 Brinell scale points harder than a core of the ferrule to more predictability properly engage a bite edge of the ferrule with an outer surface of a tube, in a proper manner, without dulling the bite edge. For example, a core of an exemplary ferrule may have a hardness equal to or greater than a tube the ferrule engages with and later hardened. The outer 0.0001-0.005 inches of the outer surface of ferrule may be surface hardened. Alternatively, the core may initially have a hardness less than a corresponding tube and the outer layer may be hardened to a hardness greater than the tube to allow the ferrule to cleanly bite into the tube.

Exemplary hardening techniques include gas infusion methods (for example, nitriding, carbo-nitriding, etc.), hard coatings (for example, carbon and diamond-like coatings, titanium nitride, etc.), mechanical surface hardening (for example, burnishing, etc.), or any other suitable surface hardening method. The ferrule may have a hardness greater than HRB 95 or a tensile strength greater than 100 ksi. The ferrule may include any suitable material with a sufficient hardness and strength, such as stainless steels and other corrosion resistant alloys. For example, the ferrule may include XM-19 and may be surface hardened. Alternatively, the ferrule may include austenitic stainless steels and precipitation hardened alloys like 718.

Figure 2:
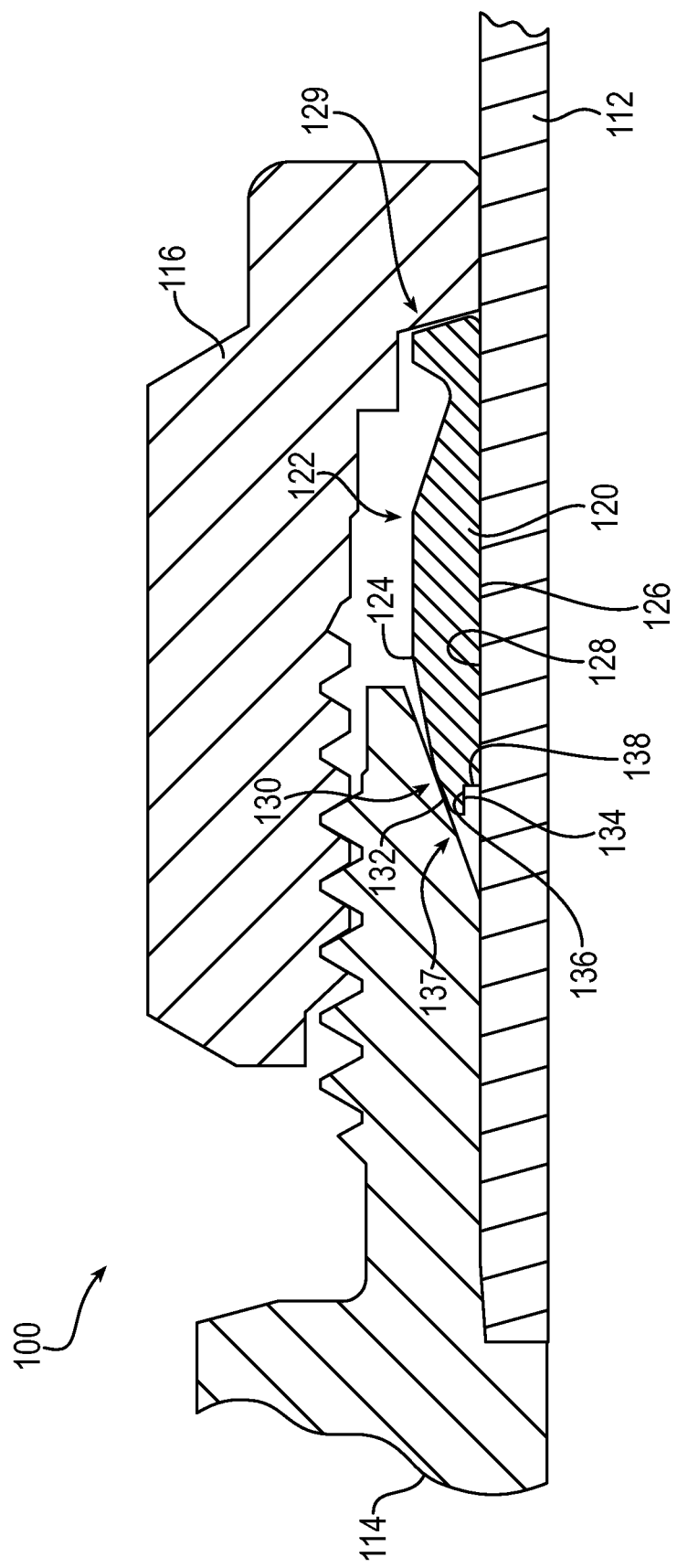
FIG. 2 shows a top-half cross-sectional view of an exemplary single ferrule compression fitting having a recessed bite edge.
Figure 3B:
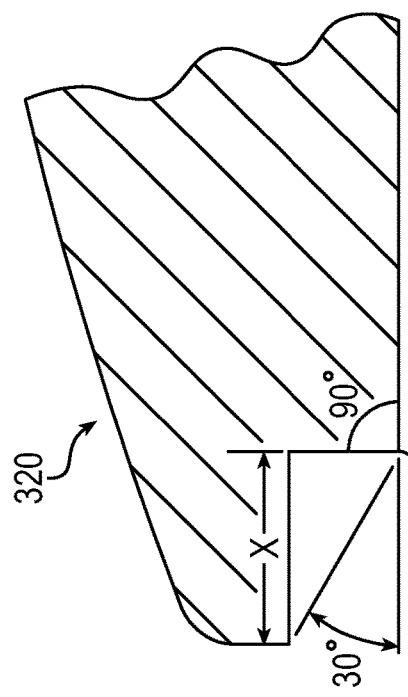
FIG. 3b shows a partial cross-sectional view of an exemplary ferrule having a recessed bite edge.
Figure 3D:
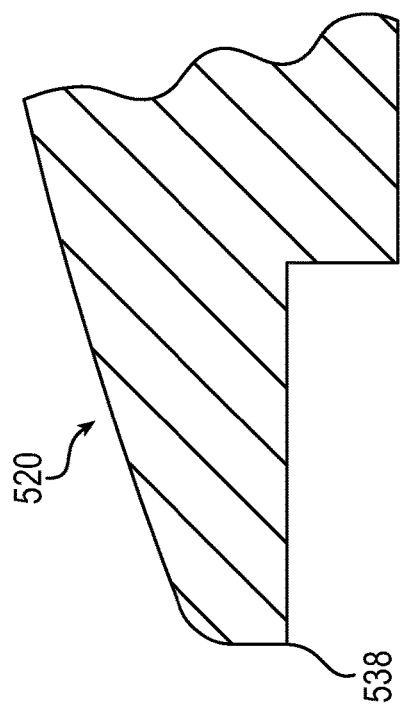
FIG. 3d shows a partial cross-sectional view of another ferrule having a recessed bite edge.
Figure 3A:
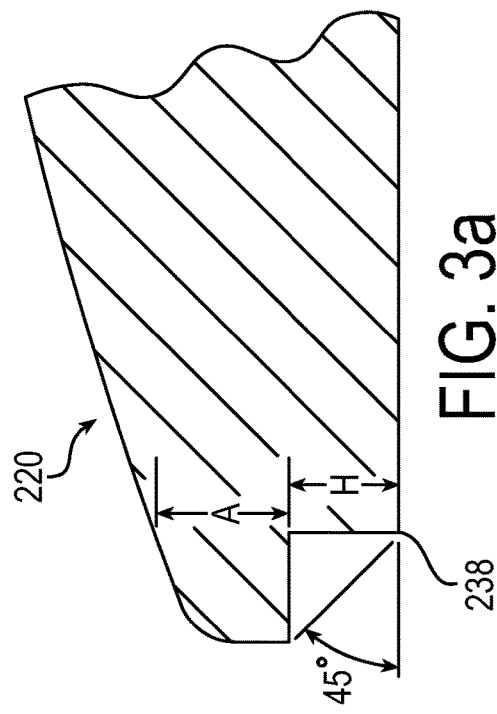
FIG. 3a shows a partial cross-sectional view of an exemplary ferrule having a recessed bite edge.
Figure 3C:
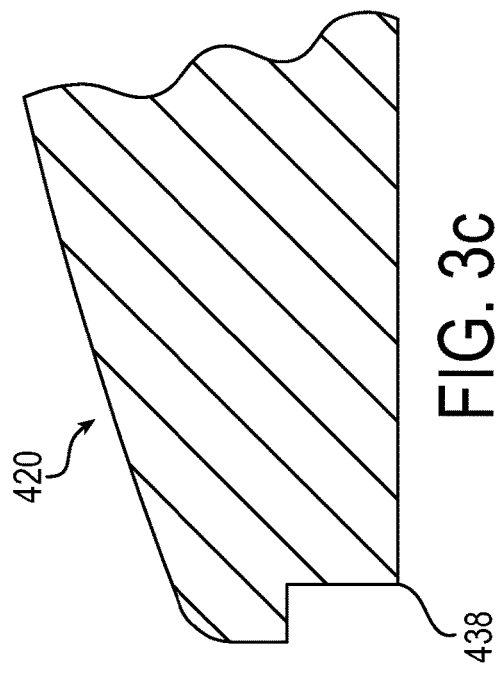
FIG. 3c shows a partial cross-sectional view of another ferrule having a recessed bite edge.

Referring now to FIG. 2, an exemplary tube fitting assembly 100 is illustrated. The assembly includes a tube 112 coupled to a fitting body 114 by a nut 116 and a ferrule 120.

The ferrule includes a body portion 122 having an outer cam surface 124 for bearing against the fitting body 114. In a two ferrule embodiment in which the illustrated ferrule 120 is a back ferrule, the outer cam surface 124 would be configured to bear against a front ferrule. The body portion 122 also has an inner surface 126 defining a central bore 128 extending through a length of the body portion along a longitudinal direction from a bite edge 138 to a nut end 129.

A nose portion 130 includes an outer cam surface 132 for bearing against a fitting body. In a two ferrule embodiment in which the illustrated ferrule 120 is a back ferrule, the outer cam surface 132 would be configured to bear against a front ferrule. The nose portion 130 also includes a recess surface 134 defining a bore (also referred to herein as a counterbore) 136 extending through a length of the nose portion 130 along the longitudinal direction from a bite end 137 to the bite edge 138.

Turning now to FIG. 3, exemplary embodiments of the ferrule are shown at 220, 320, 420, and 520. The ferrules 220, and 320, 420, 520 are substantially the same as the above-referenced ferrule 120, and consequently the same reference numerals but indexed by 100 are used to denote structures corresponding to similar structures in the ferrule. In addition, the foregoing description of the ferrule 120 is equally applicable to the ferrules 220, and 320, 420, 520 except as noted below. Moreover, it will be appreciated upon reading and understanding the specification that aspects of the ferrules may be substituted for one another or used in conjunction with one another where applicable.

The inner diameter of the nose portion 230, 330, 430, 530 is greater than the inner diameter of the body portion, thus providing a recessed biting edge 238, 338, 438, 538— recessed a distance, X, along the longitudinal direction toward the nut end—which bites into a tube after makeup. The recessed bite edge better protects the bite edge from accidental damage during the life of the ferrule. In particular, handling damage can occur from numerous sources including but not limited to manufacture, transporting, storage, installation, etc. The further the bite edge is recessed the more it is protected from handling damage. Also, recessing the bite edge makes it easier to collapse the nose of the ferrule by reducing nose material and moving the peak compressive load back from the nose of the ferrule. However, the more the bite edge is recessed the more difficult it is to maintain compression load and the grip/bite edge. Therefore, maintaining an initial angle of 45°-30° between the nose and bite edge is optimum, and is shown in FIG. 3. Therefore, although X could be between about 0.5 and 2 times H, it is more preferably between 1 and √3 times H.

In contrast, a higher angle increases potential for bite edge damage and makes the nose more difficult to compress on to the tube, and a lower angle provides very little additional damage protection and eventually reduces ferrule grip. An unexpected benefit of this recessed bite edge is that preset tool wear is also reduced and thus life is increased. Likewise it is likely that fitting remake life would be increased as well.

The recessed bite edge should also be formed in such a way as to optimize bite in this configuration. Therefore, an angle between the bite edge and the inner surface is between 75 and 115 degrees in exemplary embodiments. In some exemplary embodiments the angle between the bite edge and the inner surface is approximately 90 degrees.

Figure 4A:
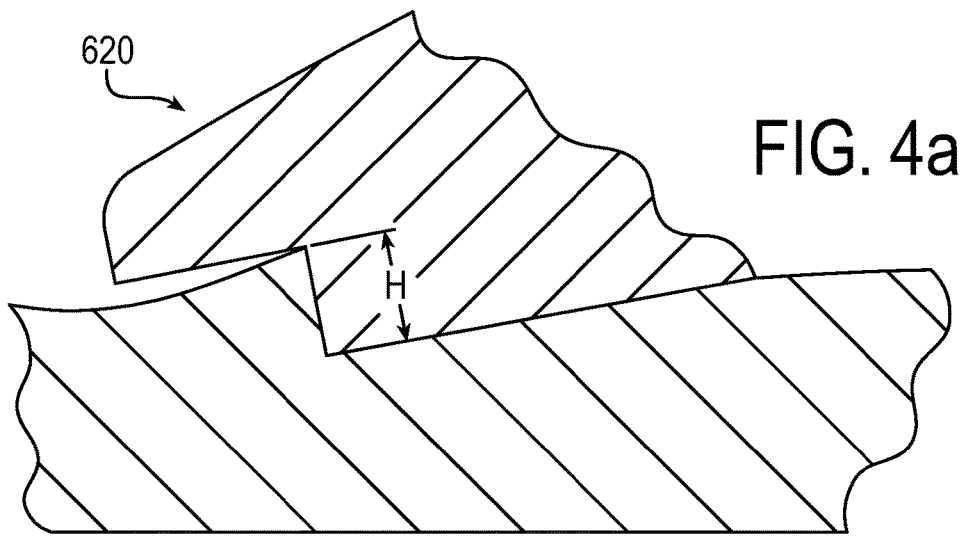
FIG. 4a shows a partial cross-sectional view of a tube fitting assembly having a recessed bite edge and a well-proportioned bite-height.
Figure 4B:
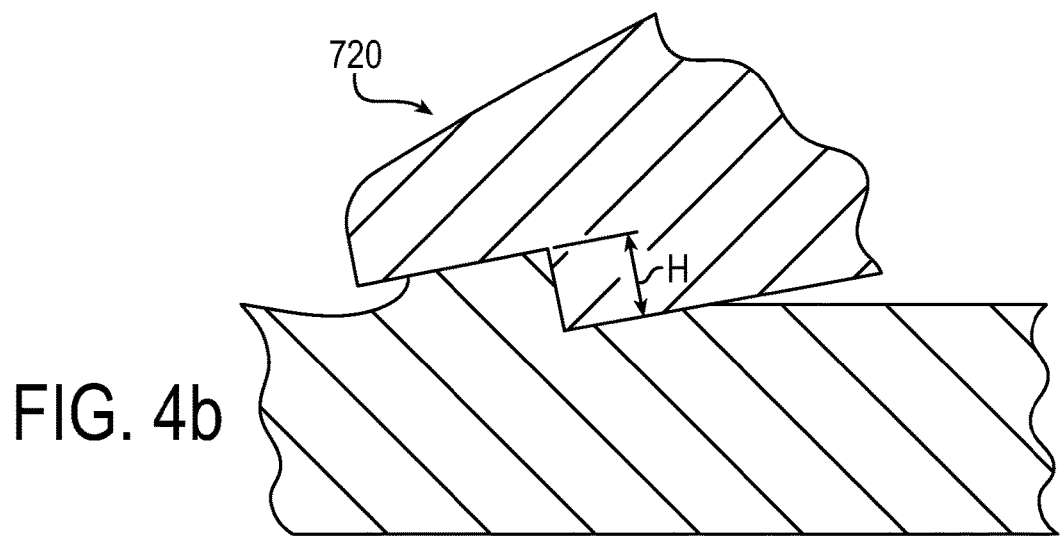
FIG. 4b shows a partial cross-sectional view of a tube fitting assembly having a recessed bite edge and a shallow bite-height.
Figure 4C:
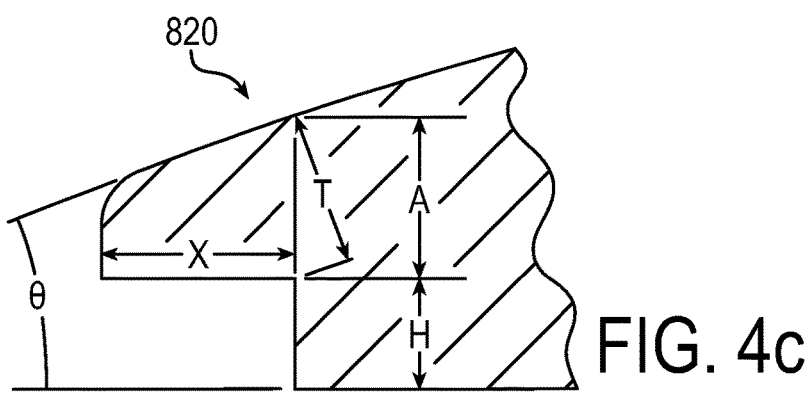
FIG. 4c shows a partial cross-sectional view of a ferrule with a recessed bite edge.
Figure 5A:
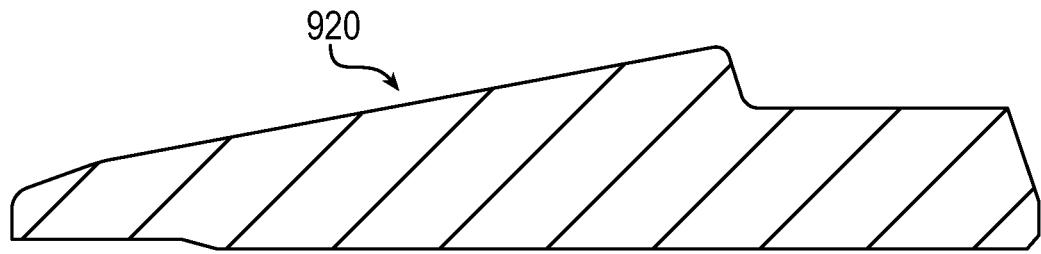
FIG. 5a shows a top-half cross-sectional view of a typical ferrule.
Figure 5B:
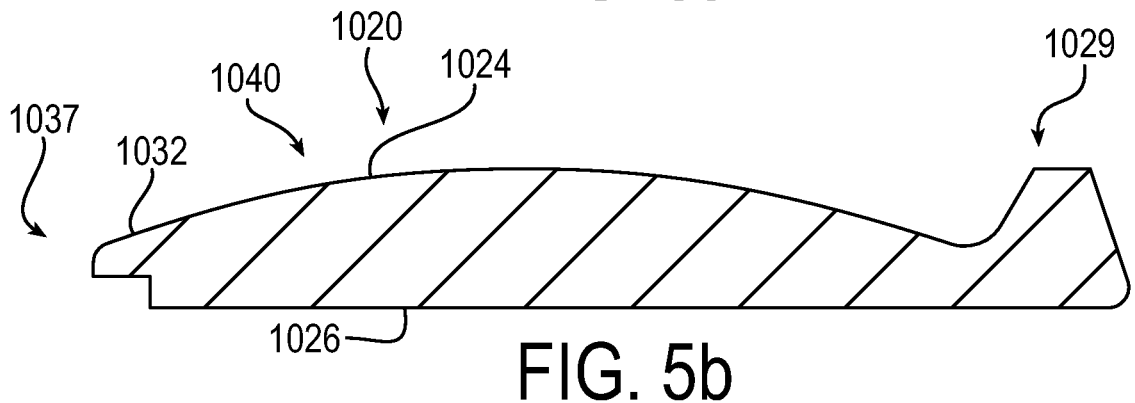
FIG. 5b shows a top-half cross-sectional view of an exemplary ferrule having curved surfaces.
Figure 5C:
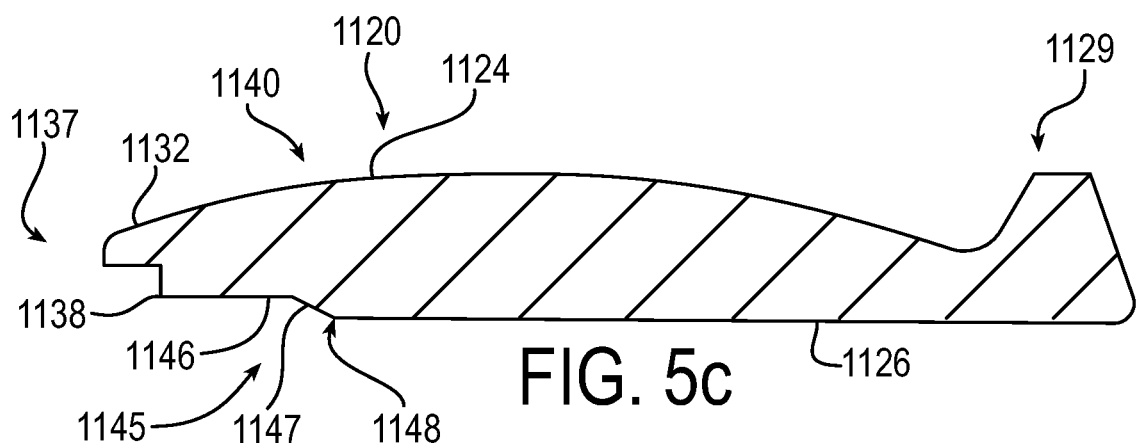
FIG. 5c shows a top-half cross-sectional view of an exemplary ferrule having curved surfaces.
Figure 5D:
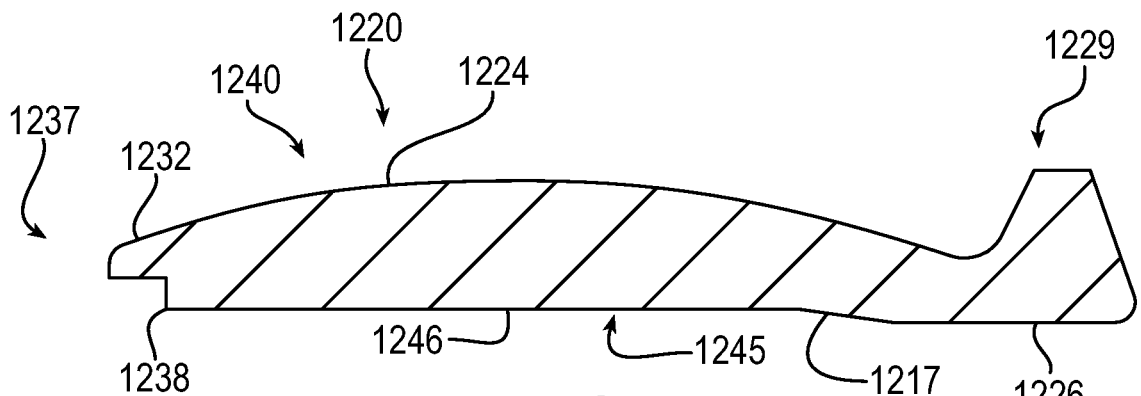
FIG. 5d shows a top-half cross-sectional view of an exemplary ferrule having curved surfaces.
Figure 5E:
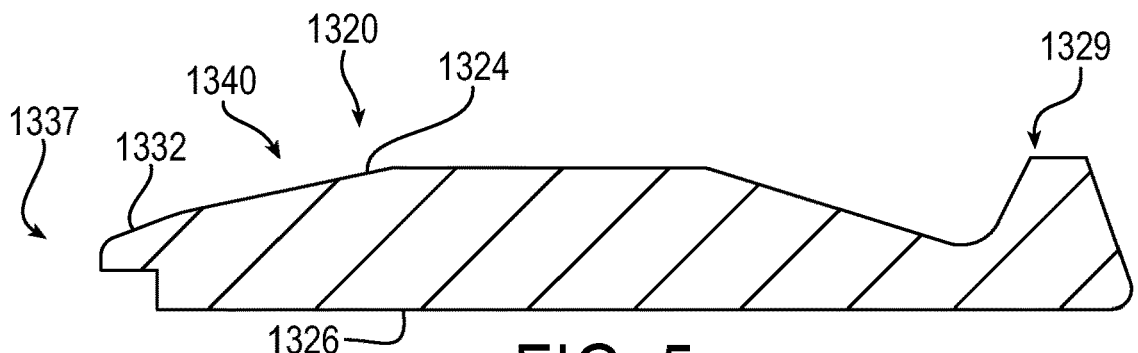
FIG. 5e shows a top-half cross-sectional view of an exemplary ferrule having curved surfaces.
Figure 5F:
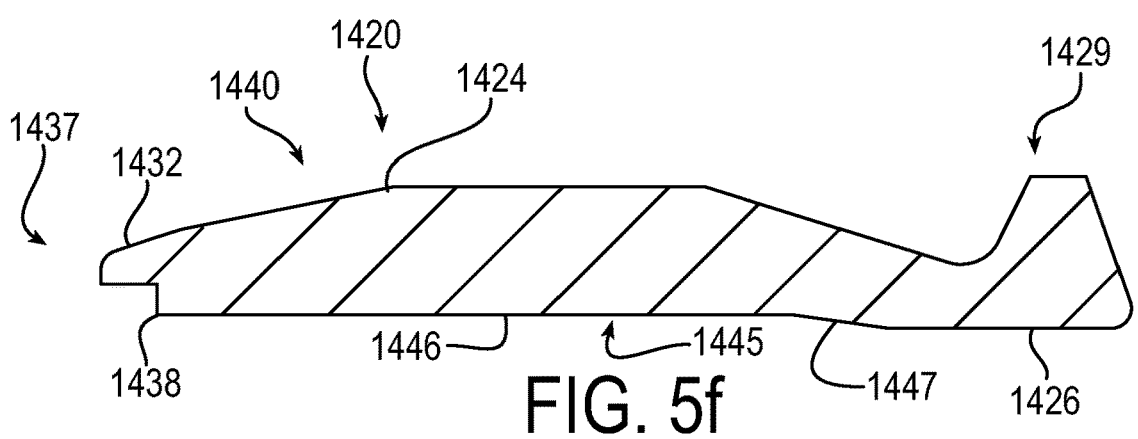
FIG. 5f shows a top-half cross-sectional view of an exemplary ferrule having curved surfaces.
Figure 5G:
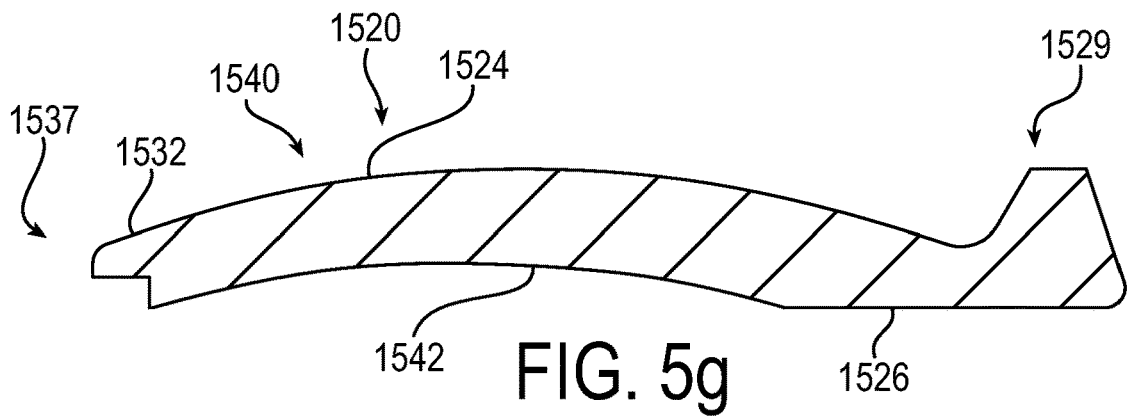
FIG. 5g shows a top-half cross-sectional view of an exemplary ferrule having curved surfaces.
Figure 5H:
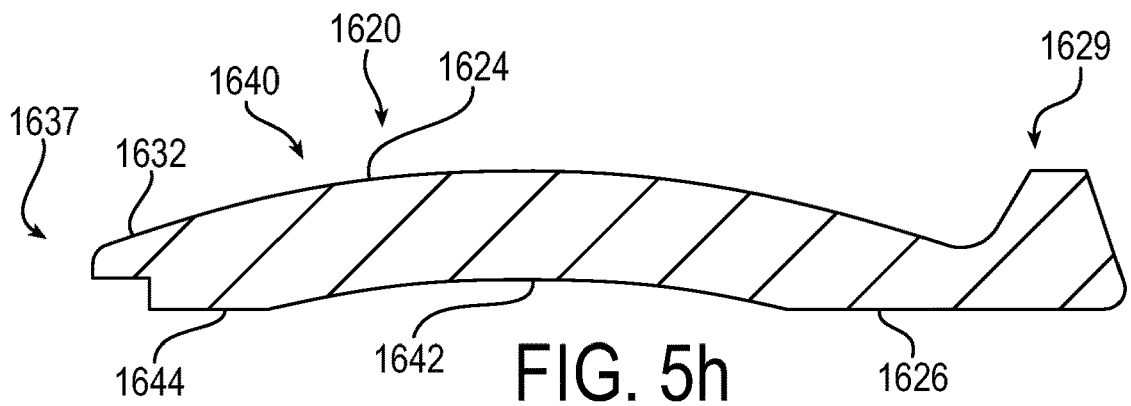
FIG. 5h shows a top-half cross-sectional view of an exemplary ferrule having curved surfaces.

The height of the recess also needs to be sufficient for the dam of tube material that is created assembling and loading the ferrule 620, 720 to maximum conditions as shown in FIG. 4. The ferrule 620, 720, 820 is substantially the same as the above-referenced ferrules 120, 220, 320, 420, 520 and consequently the same reference numerals but indexed by 100 are used to denote structures corresponding to similar structures in the ferrule. In addition, the foregoing description of the ferrules 120, 220, 320, 420, 520 is equally applicable to the ferrule 620, 720, 820 except as noted below.

Moreover, it will be appreciated upon reading and understanding the specification that aspects of the ferrules may be substituted for one another or used in conjunction with one another where applicable. As illustrated, insufficient height can result in the dam of material pushing the ferrule 520 out of its bite/grip. Although not illustrated, it will be appreciated that excessive height makes a thicker nose and makes it harder to compress the ferrule. Further, in order to distribute the load from the body onto the nose of the ferrule, a thickness or radial distance, A, from the recess surface to the outer cam surface at an axial location of the bite edge is preferably 50% or greater than a radial distance, H, from the inner surface to the recess surface. More preferably, A is between about 1 and 2 times the thickness of H. However, this height, H, will depend on material types and loading conditions.

The preferable thickness of H varies with tube properties (e.g., diameter, wall thickness, hardness, etc) and makeup load/distance, but retains a shape similar to ferrule 620. A ferrule 820 may include a nose angle θ that approximately matches a body seat angle both before and after assembly of the ferrule 820. Conventional fittings typically have an angled mismatch between the body seat and nose of about 20°, while some are bent to about 12° early in makeup. Approximately matching the nose angle θ to the body seat angle reduces bending stress across section T during makeup of the ferrule 820. Reducing bending stress allows higher loads on the ferrule 820.

The preferable nose thickness T is approximately equal to the thickness of H, for example between 70%-130% of the thickness of H. For example, QSS fittings, on the other hand, include a nose thickness T of between 45%-60% of the thickness of H. In other embodiments, the nose thickness may be less than 70% or greater than 130%. When the nose thickness T is approximately equal to the thickness of H reaction load of the body inner surface 826 is distributed to allow the ferrule 820 to slide easier and compress better on a tube.

Turning now to FIG. 5, a typical ferrule is shown at 920 and exemplary embodiments of the ferrule are shown at 1020, 1120, 1220, 1320, 1420, 1520, and 1620. The ferrules 1020, 1120, 1220, 1320, 1420, 1520, 1620 are substantially the same as the above-referenced ferrules 120, 220, 320, 620, 720, 820 and consequently the same reference numerals but indexed by 100 are used to denote structures corresponding to similar structures in the ferrule. In addition, the foregoing description of the ferrule 120, 220, 320, 620, 720, 820 is equally applicable to the ferrules 1020, 1120, 1220, 1320, 1420, 1520, 1620 except as noted below. Moreover, it will be appreciated upon reading and understanding the specification that aspects of the ferrules may be substituted for one another or used in conjunction with one another where applicable.

FIG. 5 shows another exemplary feature: a continuous arc/bow on the outside of the ferrule as compared to a typical ferrule. Therefore, the outer cam surfaces 1024, 1032; 1124, 1132; 1224, 1232; 1324, 1332, 1424, 1432, 1524, 1532, 1624, 1632 may include a convex portion along most of the length of the body. This are can also be simulated by a variety of tapered surfaces as in ferrule 1320. Thus, the outer cam surfaces may include a plurality of flat portions having respective angles with respect to a longitudinal axis, the respective angles collectively approximating a convex surface.

Thin sections toward the bite end 1037, 1137, 1237, 1237, 1337, 1437, 1537, 1637 and nut end 1029, 1129, 1229, 1329, 1429, 1529, 1629 of the ferrule encourages the middle of the ferrule (i.e. an axially middle portion, between the thin section and the reduced thickness portion) to bow radially outwards and the ends to bow radially inwards towards the tube when assembled. This bowing action can be increased for even stronger materials by relieving the inside of the ferrule. Thus, the inner surface 1026, 1126, 1226, 1326, 1426, 1526, 1626 may include a concave portion as shown in ferrule 1520, 1620. This bowing action improves the spring like action of the ferrule to provide better resistance to thermo-cycling and impulse loads. The bowing action at the front also provides more tube grip and bite from the ferrule with less assembly load/torque. The bowing action near the back of the ferrule makes it easier to compress on the tubing and improve vibration resistance. The concave portion 1542 of ferrule 1520 begins at a bite edge of the ferrule 1520, which increases flexibility of the ferrule 1520. In another embodiment, the concave portion 1642 of ferrule 1620 begins axially spaced from the bite edge of ferrule 1620 by a front inner surface 1644 to adjust the flexibility of the ferrule 1620. In another embodiment the size, shape, and/or location of the concave portion 1626 may be adjusted to modify the bowing action and in turn the flexibility of the ferrule 1620. Preferably, the concave portion is shaped in conjunction with the outer surface of the ferrule so as to provide for the thinnest portion of the ferrule between the outer surface and the concave portion to be toward the leading edge of the ferrule. The curve of the outer surface and the concave portion may then, from the thinnest portion, be parallel so as to create a constant thickness ferrule, or be divergent so as to gradually increase the thickness of the ferrule so as to control the springiness of the ferrule and cause it to bend more towards the leading edge.

An undercut 1145, 1245, 1445 between the inner surface and the nose portion toward the bite end 1137, 1237, 1437 encourages the front and/or middle of the ferrule corresponding to the undercut 1145, 1245, 1445 to bow radially outwards and the front end to bow radially inwards towards the tube when assembled. The undercut 1145, 1245, 1445 is defined by a radially offset inner surface 1146, 1246, 1446 that is radially outward from the inner surface 1126, 1226, 1426 and an angled radially inward facing surface 1147, 1247, 1447 extending between the inner surface 1126, 1226, 1426 and the radially offset inner surface 1146, 1246, 1446. The undercut 1145, 1245, 1445 and the angled radially inward facing surface 1147, 1247, 1447 may extend both radially and longitudinally between the bite edge 1138, 1238, 1438 and the inner surface to allow the front end of the ferrule 1120, 1220, 1420 to more easily bend radially inward to engage the tube. The depth of the offset between the radially offset inner surface and the inner surface is between 0.002 inches and 0.010 inches in a radial dimension (the difference in diameter would therefore, be between 0.004 and 0.020 inches). In any case, this difference is less than the height H described above.

Ferrule 1120 includes the undercut 1145 formed by the radially offset inner surface 1146 extends less than 50% a longitudinal length of the ferrule 1120 and allows the corresponding bite end 1137 to collapse easier, allowing use of stronger materials. This allows a user to assemble the ferrule 1124 against stronger materials with less force. An angle runout 1148 may be positioned such that it engages with a tube during assembly. This reduces and limits the bite depth of the bite edge 1138 and provides additional tubing grip to isolate the bite from line loads (e.g., vibration, fatigue, impulses, etc.). The undercut 1145 may extend to a longitudinal position between the front of ferrule 1120 and a point where a slope of the outer cam surface 1120 becomes negative to facilitate engagement of the tube and the angle runout 1148 during assembly.

In an embodiment, the undercut 1245 extends pasta middle portion of the ferrule. For example, ferrule 1220, 1420 includes the radially offset inner surface 1246, 1446 that extends longitudinally from the bite edge 1238, 1438 to a position near the back of the ferrule 1220, 1420. In an embodiment, the radially offset inner surface 1246, 1446 extends past a point where a slope of the outer cam surface 1224, 1424 becomes negative. The additional length of the radially offset inner surface 1246, 1446 allows the bite ends 1237, 1437 of the ferrule 1220, 1420 to collapse easier during assembly and further induces the length of the ferrule 1220, 1420 to bow. Bowing of the ferrule 1220, 1420 allows additional spring and resistance to line loads. Additionally, bowing allows better wear resistance after re-assembly of the ferrule 1220, 1420. Similar design considerations allow rear ferrules (e.g., ferrules 7c, 7e, and 7g) to improve spring action and vibration resistance.

Further, the inner and outer surfaces may have respectively different curves, thereby controlling the thickness of the ferrule along its length. For example, an outer surface having a curve with a larger circumference than the inner surface may produce a thinned middle portion of the ferrule which may promote ferrule flexion. As described, this increased flexion may provide significant benefits including, for example, improved cycling fatigue resistance.

The outer cam surfaces 1024, 1032; 1124, 1132; 1224, 1232; 1324, 1332; 1424, 1432; 1524, 1532, 1624, 1632 may have respective slopes forming a continuous outer surface 1040, 1140, 1240, 1340, 1440, 1540, 1640 the continuous outer surface 1040, 1140, 1240, 1340, 1440, 1540, 1640 being free of an inflection point from at least an outermost axial extent of the nose portion to a position along the body portion from the nose portion equal to an axial length of the nose portion. An inflection point is a point, present in some ferrules, where the change in the slope (the derivative of the slope) changes from positive to negative, or negative to positive.

Turning now to FIG. 6, exemplary embodiments of the fitting assembly are shown at 1710 and 1810, and include exemplary ferrules 1720 and 1820, respectively. The fitting assemblies 1710 and 1810 and ferrules 1720 and 1820 are substantially the same as the above-referenced fitting assemblies and ferrules and consequently the same reference numerals but indexed by 100 are used to denote structures corresponding to similar structures in the ferrule. In addition, the foregoing description of the fitting assemblies and ferrules is equally applicable to the fitting assemblies 1710 and 1810 and ferrules 1720 and 1820 except as noted below. Moreover, it will be appreciated upon reading and understanding the specification that aspects of the ferrules may be substituted for one another or used in conjunction with one another where applicable.

Fitting assembly 1710 and 1810 includes a ferrule 1720 and 1820 having a reduced thickness portion 1750, 1850 near a nut end of the ferrule, the reduced thickness portion being thinner than adjacent portions of the ferrule and thus allows the ferrule to flex at a known location in a controlled manner when the fitting assembly is made up. The fitting assembly 1710 and 1810 also include a nut 1716 and 1816 having a bearing surface 1751 and 1851 for bearing against a bearing surface 1752 and 1852 of the ferrule. The bearing surface of the ferrule is 3-10 degrees more or less than the bearing surface of the nut, the angle mismatch thereby causing the reduced thickness portion to flex in a predetermined direction during make up, either radially outward or radially inward. In a preferred embodiment, the bearing surface of the ferrule is about 5 degrees more or 5 degrees less than the bearing surface of the nut. In either instance, a portion of the rear part of the ferrule compresses into the tube, due to the nut end of the ferrule pivoting about the reduced thickness portion, to better isolate vibration and lines loads from the seals at the front of the ferrule.

Figure 7A:
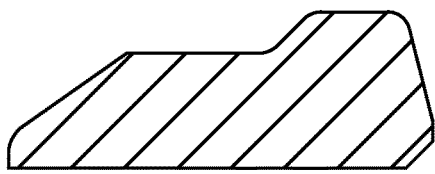
FIG. 7a shows top-half cross-sectional view of a conventional ferrule that can be employed in an exemplary tube fitting assembly by mixing the conventional ferrule with an exemplary ferrule.
Figure 7B:
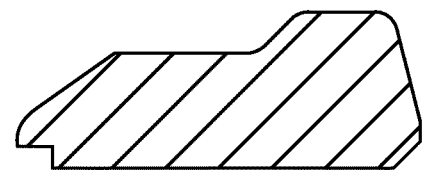
FIG. 7b shows a top-half cross-sectional view of a ferrule that can be employed in an exemplary tube fitting assembly by mixing the ferrule with a conventional ferrule or an exemplary ferrule.
Figure 7C:
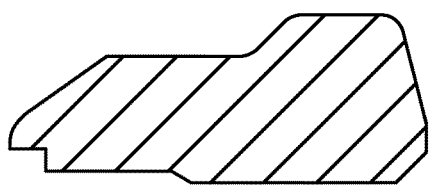
FIG. 7c shows a top-half cross-sectional view of a ferrule that can be employed in an exemplary tube fitting assembly by mixing the ferrule with a conventional ferrule or an exemplary ferrule.
Figure 7D:
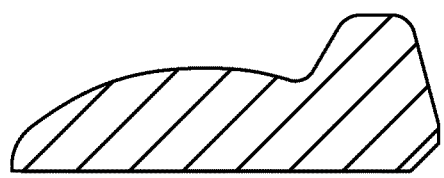
FIG. 7d shows a top-half cross-sectional view of a ferrule that can be employed in an exemplary tube fitting assembly by mixing the ferrule with a conventional ferrule or an exemplary ferrule.
Figure 7E:
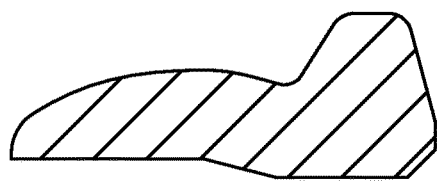
FIG. 7e shows a top-half cross-sectional view of a ferrule that can be employed in an exemplary tube fitting assembly by mixing the ferrule with a conventional ferrule or an exemplary ferrule.
Figure 7F:
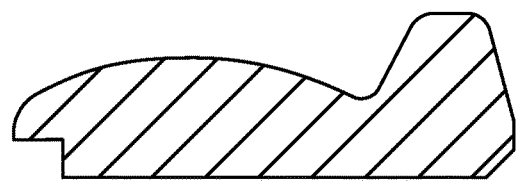
FIG. 7*f* shows a top-half cross-sectional view of a ferrule that can be employed in an exemplary tube fitting assembly by mixing the ferrule with a conventional ferrule or an exemplary ferrule.
Figure 7G:
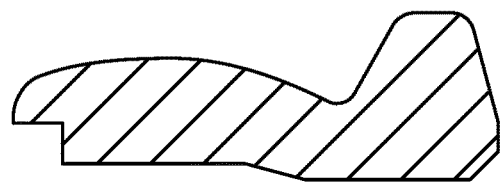
FIG. 7*g* shows a top-half cross-sectional view of a ferrule that can be employed in an exemplary tube fitting assembly by mixing the ferrule with a conventional ferrule or an exemplary ferrule.
Figure 7H:
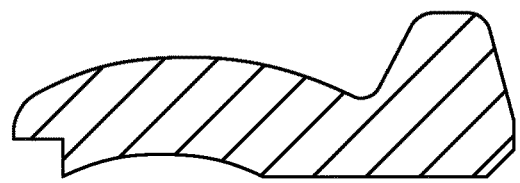
FIG. 7*h* shows a top-half cross-sectional view of a ferrule that can be employed in an exemplary tube fitting assembly by mixing the ferrule with a conventional ferrule or an exemplary ferrule.
Figure 7I:
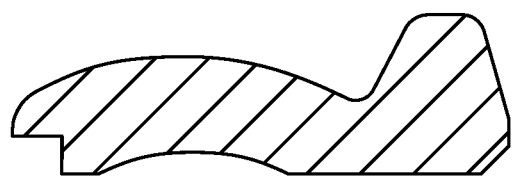
FIG. 7*i* shows a top-half cross-sectional view of a ferrule that can be employed in an exemplary tube fitting assembly by mixing the ferrule with a conventional ferrule or an exemplary ferrule.
Figure 7J:
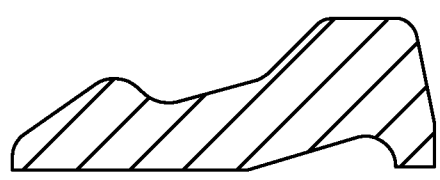
FIG. 7*j* shows a top-half cross-sectional view of a conventional ferrule that can be employed in an exemplary tube fitting assembly by mixing the conventional ferrule with an exemplary ferrule.
Figure 7K:
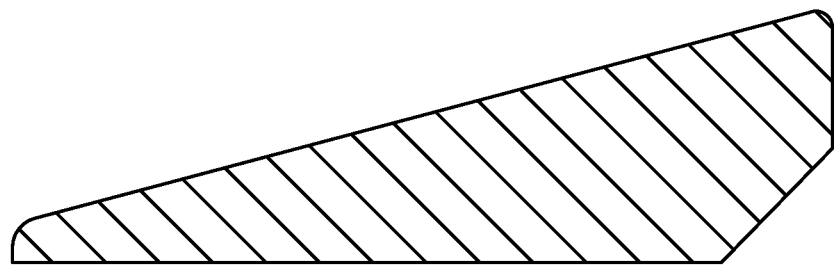
FIG. 7*k* shows a top-half cross-sectional view of a conventional ferrule that can be employed in an exemplary tube fitting assembly by mixing the conventional ferrule with an exemplary ferrule.
Figure 7:
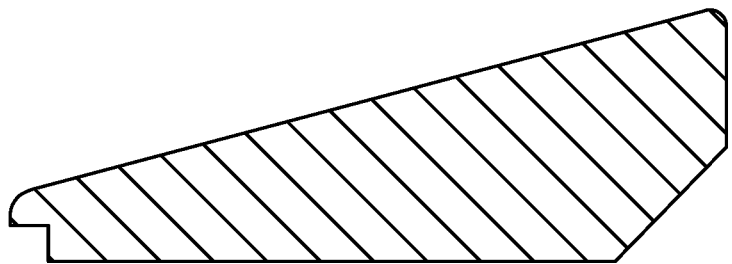
FIG. 7*l* shows a top-half cross-sectional view of a ferrule that can be employed in an exemplary tube fitting assembly by mixing the ferrule with a conventional ferrule or an exemplary ferrule.
Figure 8A:
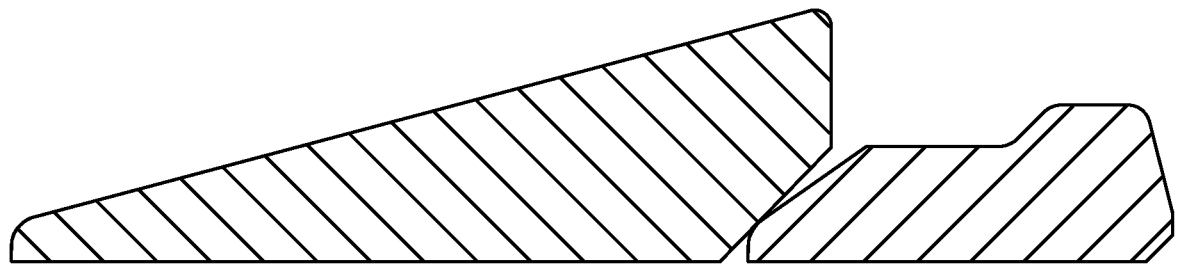
FIG. 8*a* shows a top-half cross-sectional view of conventional ferrules.
Figure 8B:
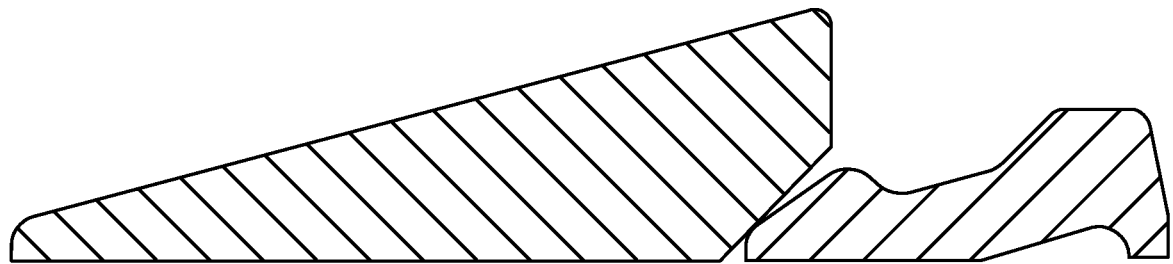
FIG. 8*b* shows a top-half cross-sectional view of a front and back ferrule.
Figure 8C:
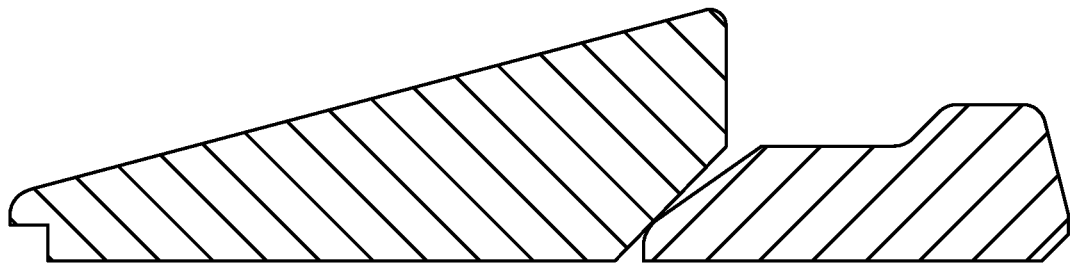
FIG. 8*c* shows a top-half cross-sectional view of a front and back ferrule.
Figure 8D:
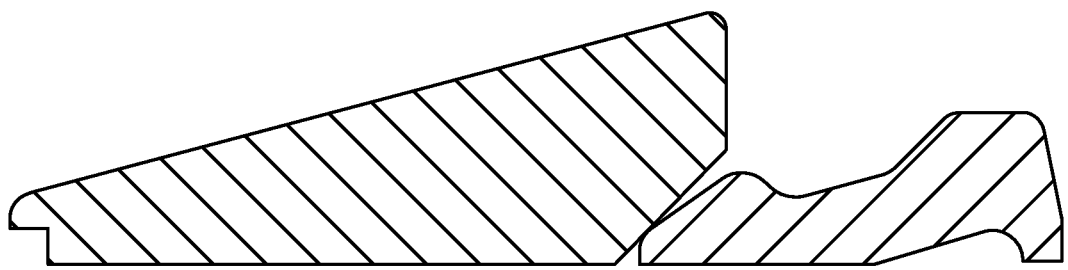
FIG. 8*d* shows a top-half cross-sectional view of a front and back ferrule.
Figure 8E:
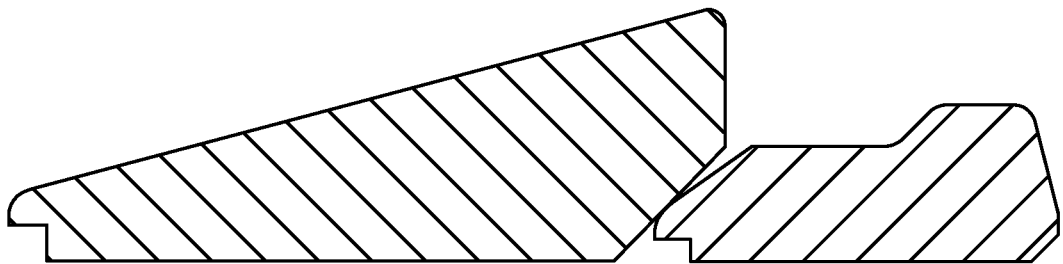
FIG. 8*e* shows a top-half cross-sectional view of a front and back ferrule.
Figure 8F:
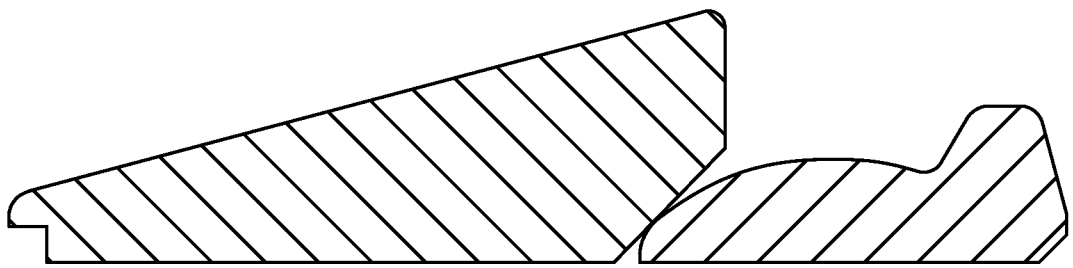
FIG. 8*f* shows a top-half cross-sectional view of a front and back ferrule.
Figure 8G:
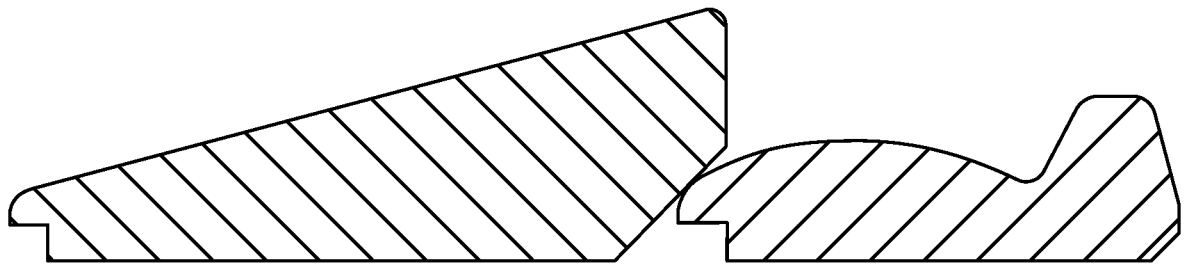
FIG. 8*g* shows a top-half cross-sectional view of a front and back ferrule.
Figure 8H:
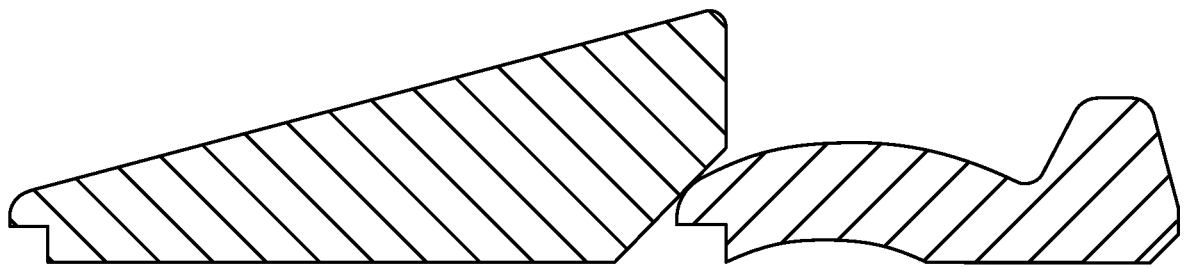
FIG. 8*h* shows a top-half cross-sectional view of a front and back ferrule.

Turning now to FIG. 7, various ferrules, back and front, for use in a two ferrule assembly, are shown and styles "7b" thru "7i" & "7l" incorporate various aspects of the present invention ("7a", "7j" & "7k" show conventional ferrules). These exemplary ferrules and others may be matched with each other to form various combinations of front and back ferrules in ways which will, upon reading and understanding the present disclosure, be apparent to those of skill in the art. As mentioned above, ferrule 7c, 7e, 7g include an undercut portion that allows additional ferrule bow (spring) and improves resistance to line loads and wear resistance during re-assembly of the ferrule 7c, 7e, 7g.

Turning now to FIG. 8, various ferrules, back and front, for use in a two ferrule assembly, are shown and configurations "8b" through "8h" incorporate various aspects of the present invention ("8a" shows conventional ferrules). These exemplary ferrules and others may be matched with each other to form various combinations of front and back ferrules in ways as shown and which will, upon reading and understanding the present disclosure, be apparent to those of skill in the art.

Figure 9A:
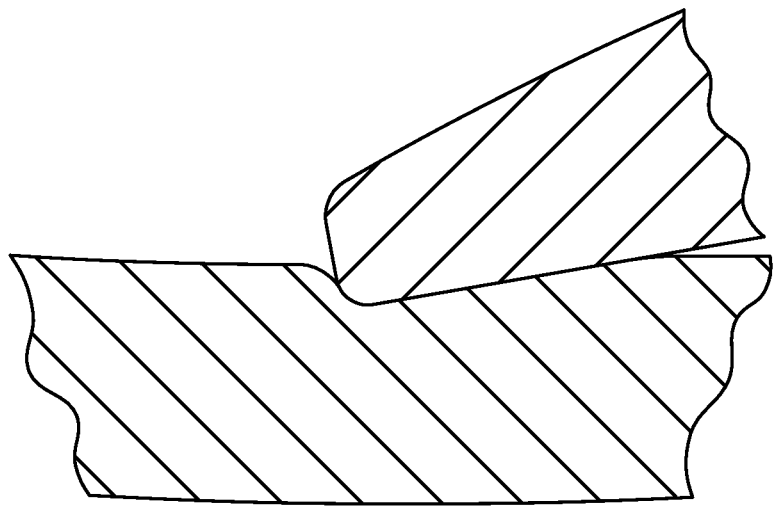
FIG. 9*a* shows a top-half cross-sectional view of a ferrule engaging an outer surface of a tube without a bite edge.
Figure 9B:
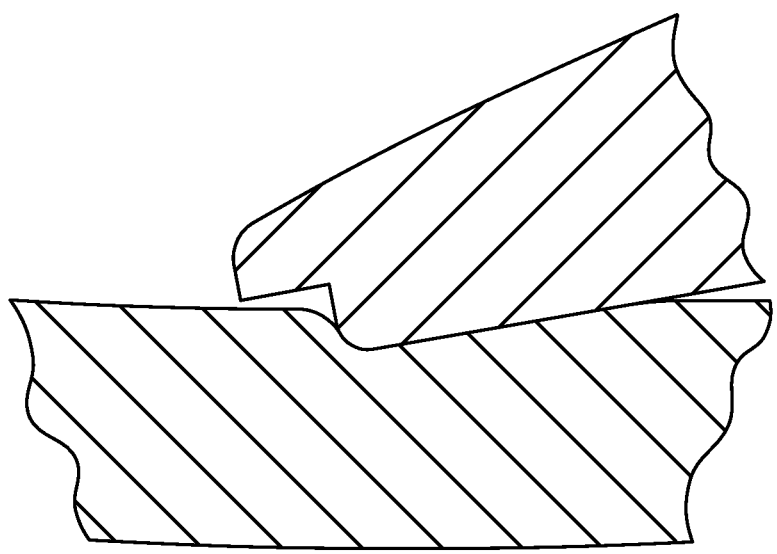
FIG. 9*b* shows a top-half cross-sectional view of an exemplary ferrule engaging an outer surface of a tube with a recess surface.

Turning now to FIG. 9, "9a" shows a conventional ferrule without a bite edge engaging an outer wall of a tube and "9b" shows an exemplary ferrule with a recess surface in a bite end without a bite edge engaging an outer wall of a tube. The recess surface of the bite end helps protect the radially inward portion of the nose portion that engages the outer wall of the tube. For example, the recess surface separates the radially inward portion from potential damage caused by transporting or assembly of the ferrule.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fitting assembly for coupling a first tube to a fitting body, the fitting assembly comprising:
   a ferrule including:
   a reduced thickness portion closer to a nut end of the ferrule than a bite end of the ferrule opposite the nut end, the reduced thickness portion being thinner than adjacent portions of the ferrule and configured to flex when the fitting assembly is made up;
   a nose portion toward the bite end of the ferrule, wherein an axially middle portion, between the nose portion and the reduced thickness portion, is configured to bow radially outwardly during assembly of the ferrule such that the bite edge and a portion of an inner surface opposite the bite edge, relative to the axially middle portion, are engageable with the tube; and
   a nut having a bearing surface for bearing against a bearing surface of the ferrule;
   wherein the reduced thickness portion has a radial thickness less than any other portion of the ferrule between the nut end and a bite edge of the ferrule closest to the nut end; and
   wherein a radially inward facing surface of the reduced thickness portion flexes radially inward to compress into the first tube before adjacent portions of the ferrule.

2. The fitting assembly of claim 1, wherein the nose portion includes an outer cam surface for bearing against the fitting body or another ferrule to bend radially inward during assembly of the ferrule;
   wherein the inner surface defines a central bore extending through a length of a body of the ferrule along a longitudinal direction from the bite edge to the nut end;
   wherein a recess surface defines a counter bore extending from a bite end to the bite edge, the bite edge thereby recessed from the bite end a distance, X, along the longitudinal direction toward the nut end;
   wherein a radial distance, A, from the recess surface to the outer cam surface at an axial location of the bite edge is 50% or greater than a radial distance, H, from the inner surface to the recess surface;
   wherein the ferrule includes a nose angle, θ, defined by the longitudinal axis and the outer cam surface, the fitting body or the another ferrule includes a body seat angle defined by the longitudinal axis and a radially inwardly facing surface of the fitting body or the another ferrule, and the nose angle, θ, approximately matches the body seat angle of the fitting body or the another ferrule both before and after the nose bends radially inward during assembly of the ferrule, thereby reducing bending stress across a nose thickness, T, during makeup of the ferrule; and
   wherein the nose thickness, T, extends normal to a portion of the outer cam surface to an axial end, of the recess surface, that is opposite the bite end.

3. The fitting assembly of claim 1, wherein an angle of the bearing surface of the ferrule is between 3 and 10 degrees different than the angle of the bearing surface of the nut, the angle mismatch thereby causing the reduced thickness portion to flex in a predetermined direction during make up.

4. The fitting assembly of claim 1, wherein the bearing surface of the ferrule is about 5 degrees more or 5 degrees less than the bearing surface of the nut, the angle mismatch thereby causing the reduced thickness portion to flex in a predetermined direction during make up.

5. The fitting assembly of claim 1, wherein the ferrule is surface hardened.

6. The fitting assembly of claim 1, wherein the ferrule further includes an undercut between the inner surface and a nose portion.

7. The fitting assembly of claim 1, wherein a nose thickness, T, is 70% of a radial distance, H, or greater, wherein the radial distance, H, is from the inner surface to a recess surface defining a counter bore extending from a bite end to the bite edge.

8. The fitting assembly of claim 1, wherein the bite edge is the only bite edge axially opposite the portion of the inner surface relative to the axially middle portion.

9. The fitting assembly of claim 1, wherein the ferrule further includes:
   a body portion having an outer cam surface for bearing against the fitting body or another ferrule, wherein the inner surface defines a central bore extending through a length of the body portion along a longitudinal direction; and
   a nose portion having an outer cam surface for bearing against the fitting body or another ferrule and having a recess surface defining a bore extending through a length of the nose portion along the longitudinal direction;
   wherein an inner diameter of the nose portion is greater than an inner diameter of the body portion; and
   wherein the outer cam surfaces have respective slopes forming a continuous outer surface, the continuous outer surface being free of an inflection point from at least an outermost axial extent of the nose portion to a position along the body portion from the nose portion equal to an axial length of the nose portion, wherein prior to assembly of the ferrule the outer cam surface includes a convex portion that extends along most of a length of the ferrule.

10. The fitting assembly of claim 9, wherein the bearing surface of the ferrule is about 5 degrees more or 5 degrees less than the bearing surface of the nut, the angle mismatch thereby causing the reduced thickness portion to flex in a predetermined direction during make up.

11. The fitting assembly of claim 9, wherein the ferrule further includes an undercut between the inner surface and the nose portion.

12. The fitting assembly of claim 9, wherein a nose thickness, T, is 70% of a radial distance, H, or greater, wherein the radial distance, H, is from the inner surface to the recess surface.

13. The fitting assembly of claim 9, wherein the bite edge is the only bite edge axially opposite the portion of the inner surface relative to the axially middle portion.

14. A ferrule for coupling a tube to a fitting body of a fitting assembly including:
   a reduced thickness portion closer to a nut end of the ferrule than a bite end of the ferrule opposite the nut end, the reduced thickness portion being thinner than adjacent portions of the ferrule and configured to flex when the fitting assembly is made up; and
   a nose portion toward the bite end of the ferrule, wherein an axially middle portion, between the nose portion and the reduced thickness portion, is configured to bow radially outwardly during assembly of the ferrule such that the bite edge and a portion of an inner surface opposite the bite edge, relative to the axially middle portion, are engageable with the tube;
   wherein the reduced thickness portion has a radial thickness less than any other portion of the ferrule between the nut end and a bite edge of the ferrule closest to the nut end;
   wherein the ferrule includes a radially outwardly facing concave portion, the reduced thickness portion extending from the concave portion to the inner surface; and
   wherein prior to assembly of the ferrule the outer cam surface includes a convex portion that extends along most of a length of the ferrule.

15. The ferrule of claim 14, wherein the ferrule further includes:
   a body portion having an outer cam surface for bearing against the fitting body or another ferrule, wherein the inner surface defines a central bore extending through a length of the body portion along a longitudinal direction; and
   wherein the nose portion has an outer cam surface for bearing against the fitting body or another ferrule;
   wherein the outer cam surfaces have respective slopes forming a continuous outer surface, the continuous outer surface being free of an inflection point from at least an outermost axial extent of the nose portion to a position along the body portion from the nose portion equal to an axial length of the nose portion, wherein prior to assembly of the ferrule the outer cam surface includes a convex portion that extends along most of a length of the ferrule.

16. The ferrule of claim 14, wherein the nut end forms an axially facing surface that faces away from the reduced thickness portion and the bite end, and wherein the axially facing surface faces radially outwardly.

17. A ferrule for coupling a tube to a fitting body a fitting assembly including:
   a reduced thickness portion closer to a nut end of the ferrule than a bite end of the ferrule opposite the nut end, the reduced thickness portion being thinner than adjacent portions of the ferrule and configured to flex when the fitting assembly is made up; and
   a nose portion toward the bite end of the ferrule, wherein an axially middle portion, between the nose portion and the reduced thickness portion, is configured to bow radially outwardly during assembly of the ferrule such that the bite edge and a portion of an inner surface opposite the bite edge, relative to the axially middle portion, are engageable with the tube;
   wherein the reduced thickness portion has a radial thickness less than any other portion of the ferrule between the nut end and a bite edge of the ferrule closest to the nut end; and
   wherein the ferrule includes a radially outwardly facing concave portion, that is formed by an arcuate surface that faces radially outwardly, and the reduced thickness portion extends from the arcuate surface to the inner surface.

* * * * *